(12) United States Patent
Lee et al.

(10) Patent No.: US 9,448,709 B2
(45) Date of Patent: *Sep. 20, 2016

(54) METHOD FOR FINELY CONTROLLING CONTENTS AND PORTABLE TERMINAL SUPPORTING THE SAME

(71) Applicant: Samsung Electronics Co., Ltd., Gyeonggi-do (KR)

(72) Inventors: John Lee, Daegu (KR); Su Jung Youn, Gyeonggi-do (KR); Sang Ki Lee, Seoul (KR); Su Mi Shim, Gyeonggi-do (KR); Wan Soo Lim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,910

(22) Filed: Oct. 17, 2014

(65) Prior Publication Data

US 2015/0040054 A1 Feb. 5, 2015

Related U.S. Application Data

(63) Continuation of application No. 13/433,750, filed on Mar. 29, 2012, now Pat. No. 8,878,799.

(30) Foreign Application Priority Data

May 2, 2011 (KR) .................. 10-2011-0041379

(51) Int. Cl.
G06F 3/0484 (2013.01)
G06F 3/0488 (2013.01)
G06F 3/0485 (2013.01)

(52) U.S. Cl.
CPC ......... *G06F 3/04847* (2013.01); *G06F 3/0485* (2013.01); *G06F 3/0488* (2013.01)

(58) Field of Classification Search
CPC .......... G06F 3/00; G06F 3/041; G06F 3/048; G06F 3/0484–3/0488; G06F 3/04847
See application file for complete search history.

(56) References Cited

U.S. PATENT DOCUMENTS

| 6,204,846 | B1 | 3/2001 | Little et al. | |
| 6,501,489 | B1* | 12/2002 | Kobayashi | 715/833 |
| 2006/0059436 | A1 | 3/2006 | Nurmi | |
| 2008/0141165 | A1* | 6/2008 | Feig et al. | 715/786 |
| 2008/0178116 | A1 | 7/2008 | Kim | |
| 2009/0282362 | A1* | 11/2009 | Matsumoto | G06F 3/04855 715/787 |
| 2010/0156830 | A1* | 6/2010 | Homma et al. | 345/173 |

FOREIGN PATENT DOCUMENTS

JP 11-110181 A 4/1999

* cited by examiner

*Primary Examiner* — Lun-Yi Lao
*Assistant Examiner* — Johny Lau
(74) *Attorney, Agent, or Firm* — Cha & Reiter, LLC.

(57) ABSTRACT

A method for coarsely and finely controlling contents via respective main and auxiliary sliders, and a portable terminal supporting the same are provided. The portable terminal includes: a display unit displaying a main slider including a slidable path of a predetermined length for designating a predetermined region of contents and an auxiliary slider extending at least a part of a slidable path of the main slider; a touch screen detecting a signal for selectively displaying the auxiliary slider; and a controller for performing a control operation to display the auxiliary slider according to generation of the signal.

14 Claims, 5 Drawing Sheets

METHOD FOR FINELY CONTROLLING CONTENTS AND PORTABLE TERMINAL SUPPORTING THE SAME

CROSS REFERENCE TO RELATED APPLICATIONS

This application is a Continuation of U.S. patent application Ser. No. 13/433,750, filed on Mar. 29, 2012 which claims the benefit under 35 US.C. §119 a of a Korean patent application filed in the Korean Intellectual Property Office on May 2, 2011 and assigned Serial No. 10-2011-0041379, the entire disclosure of which is hereby incorporated by reference.

BACKGROUND

1. Technical Field

The present disclosure relates to portable terminals, and more particularly, to a method for controlling a display of contents in a portable terminal.

2. Description of the Related Art

Portable terminals such as cell phones and smartphones support a call function based on mobility, and have expanded their functionality for use in a variety of fields due to advancing technology. Today's portable terminals provide various input methods to provide user functions. For example, as a conventional portable terminal provides a touch screen (including a touch panel and a display unit), a user may process an operation on the touch screen to select a specific image to be displayed. For instance, a progress bar/search bar is typically provided, which a user can drag to scroll through a stored video program, thus enabling the user to search for a desired scene and start reproduction from that scene. Further, the portable terminal creates a touch event due to a corresponding user operation and controls an application program corresponding to a user function based on the created touch event.

A portable terminal has a display region smaller than that of larger devices like desktop PCs, to support mobility and portability. Accordingly, a conventional portable terminal outputs information for supporting various functions on a display region of a relatively small size. When the conventional portable terminal displays or plays certain contents configured by a plurality of elements, for example, video (i.e., a moving image) configured by a plurality of frames, it can be difficult to search for a particular scene in the video. In particular, when the user missed viewing certain desired scenes or became interrupted while watching the video, the user can perform review from a corresponding scene afterwards. However, because a function for searching a scene is supported on a small display region in the conventional portable terminal, it can be difficult to search for a desired scene. Accordingly, users may inconveniently abandon a search operation for the scene and instead just re-start viewing again from a random scene This type of problem frequently occurs due to the mobility characteristics of the portable terminal. When the user cannot precisely find a certain scene at a desired time point, it is inconvenient for the user to re-start the video from a scene already viewed. It is noted that the foregoing inconvenience can also occur in a large display device as well as a portable terminal.

Further, the portable terminal provides contents configured by a plurality of elements, for example, a plurality of items in the form of a list. Examples include a contact list of a phone book, pages in an electronic book, or a multiplicity of content on a long web page. Because it is difficult to display all of a plurality of items on one screen, a slider (also called a "scroller") is provided such that a user may search other items that are not displayed on one screen. In this case, contents searching speed using the slider may be proportional to the number of total items, the displayed size of respective items, and a touch moving distance on the slider. When the user uses a slider corresponding to items on which a relatively large display item is displayed, and having many elements, rapid moving speed of items is provided to the user. Accordingly, when the user attempts to finely search for a certain item, the screen movement is often too fast as the slider is slowly dragged. As a consequence, the search can be difficult to carry out.

SUMMARY

Disclosed is a method that provides coarse and fine search/designation of reproduced contents in a portable terminal, via display and operation of main and auxiliary sliders, and a portable terminal supporting the same.

In accordance with an aspect, a method operative in a portable terminal includes: displaying a main slider including a slidable path of a predetermined length for designating a predetermined region of contents reproduced in the terminal; determining whether a predefined input signal is generated; and displaying an auxiliary slider extending at least a part of a slidable path of the main slider when the predefined input signal is generated, the auxiliary slider finely designating the region of contents.

In accordance with another aspect, a portable terminal includes: a display unit outputting a main slider including a slidable path of a predetermined length for designating a predetermined region of contents reproduced in the terminal, and an auxiliary slider extending at least a part of a slidable path of the main slider; at least one of a touch panel and an input unit for generating a signal for selectively displaying the auxiliary slider; and a controller for performing a control operation to output the auxiliary slider according to generation of the signal.

A method for specifically controlling contents and a portable terminal supporting the same according to one or more embodiments may search a certain region of contents in detail and conveniently or easily use a function necessary for detailed marking.

BRIEF DESCRIPTION OF THE DRAWINGS

Features and advantages of the present disclosure will be more apparent from the following detailed description in conjunction with the accompanying drawings, in which like reference numerals indicate like elements or features, wherein.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
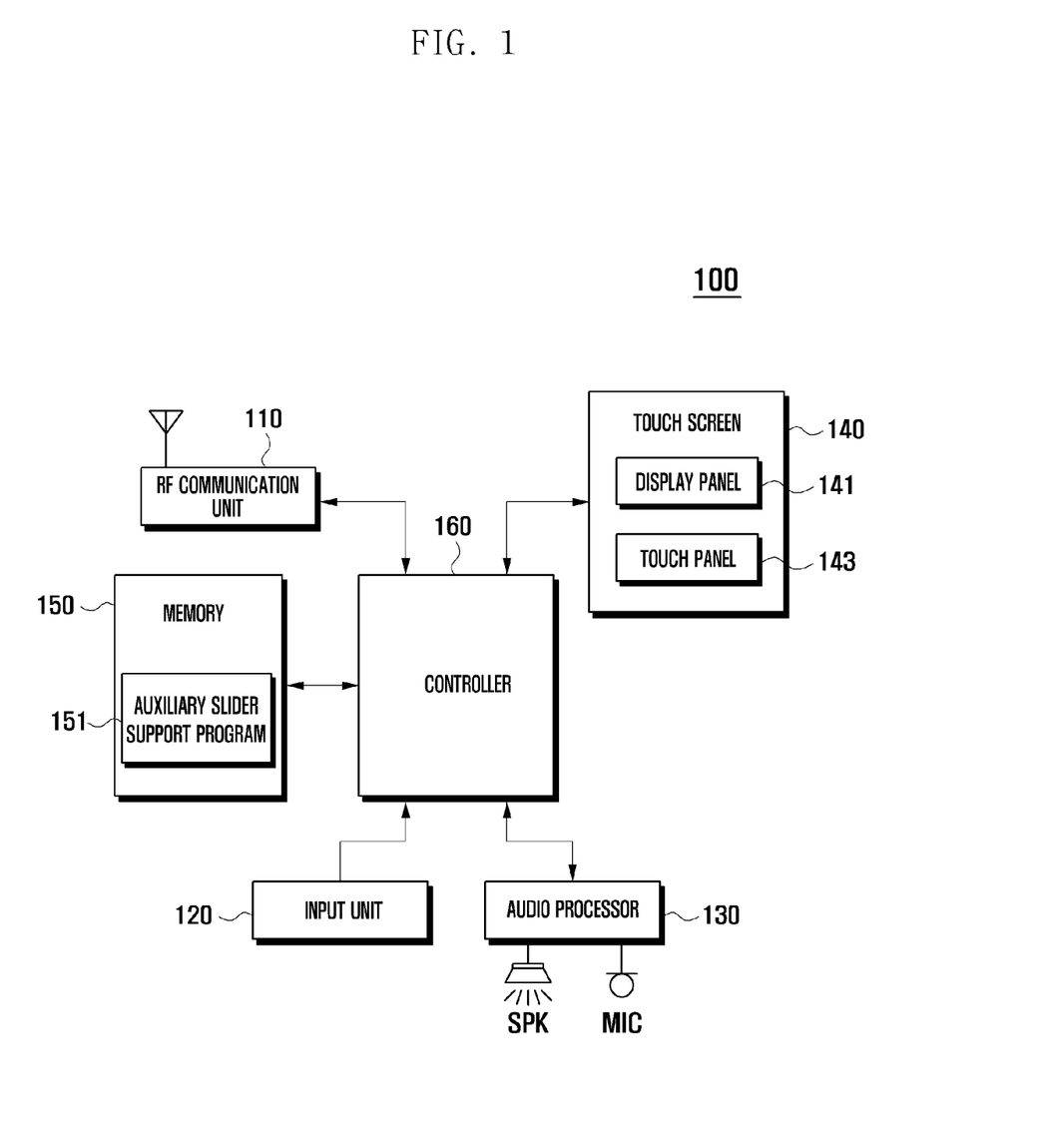
FIG. 1 is a block diagram illustrating a configuration of a portable terminal according to an exemplary embodiment of the present disclosure.

FIG. 1 is a functional block diagram illustrating a configuration of a portable terminal according to an exemplary embodiment of the present disclosure. As will be explained in detail hereafter, the portable terminal reproduces contents, such as video, audio of a music player, or photos of a photo book, pages of an electronic book, or portions of a large web page. Briefly, a main slider is displayed on a display of the portable terminal 100. "Slider", as used herein, is a visual representation that varies as a function of progress of reproduction of particular contents. For visual contents, the slider is typically superimposed therewith as the visual contents are scrolled via user movement of the slider through touch input. An example of a slider is what is commonly known as a "search bar". The slider can be a line or rectangle that elongates as a function of increasing progress of particular contents. Alternatively, the slider can be a fixed object such as a rectangle of a fixed dimension that moves across a discernible slidable path. Examples of sliders will be presented below. Portable terminal 100 additionally generates and displays an auxiliary slider (to be described) that provides an additional search function. In some implementations, the main slider is used for relatively coarse progress designation and/or searching of currently reproduced contents, while the auxiliary slider is used for relatively fine progress designation/searching of the contents.

Referring to FIG. 1, portable terminal 100 may include a radio frequency communication unit 110, an input unit 120, an audio processor 130, a touch screen 140, a memory 150, and a controller 160.

Portable terminal 100 of the present disclosure having this construction may output video or still image contents configured by a plurality of elements, for example, a plurality of frames which are stored in the memory 150 or received from an exterior on a display panel 141 (hereafter, "display" 141, interchangeably) of a touch screen 140 according to a request of a user or preset schedule information. Portable terminal 100 may selectively output a main slider capable of controlling a certain scene of a moving image and an auxiliary slider capable of controlling detailed (fine) search according to the request of the user or as default. In this case, when a predefined input signal is generated during an output state of the main slider, the auxiliary slider is output such that the user may search and control a certain region of contents designated by the main slider in detail. Accordingly, a user of the portable terminal may create a predetermined touch event on the main slider to output an auxiliary slider extending a predetermined region of the main slider. Hereinafter, functions and roles of respective elements of the portable terminal 100 associated with a detailed control function of the present disclosure will be described in detail.

Briefly stated, an auxiliary slider may have a length shorter than that of the main slider according to a type of a touch event occurring on a displayed main slider, and search or designate a certain region of reproduced contents finer than a function capable of searching or designating a certain region based on the main slider.

When contents configured by a plurality of elements are output on the touch screen 140, a slidable path of the main slider may be calculated with a rate corresponding to a total length of the contents capable of being output on the touch screen 140, and output to one side of the touch screen 140. The auxiliary slider may have a length corresponding to a region of a contents part within a predetermined width based on a location of a search bar on the main slider as a slidable path. In this case, an auxiliary slidable path of the auxiliary slider may have a length extending a part of a main slidable path of the main slider with a predetermined rate. When comparing search of the same time interval of a video program, the user may search contents while moving an indicator for search on the display 141, for example, a search bar on the auxiliary slider by a relatively great length in comparison with the main slider. As a result, the user may search an amount of contents according to a moving distance of a search bar smaller than that on the main slider to finely search contents. In this case, contents may be moving image contents configured by a plurality of frames, list contents having a plurality of elements, or setting contents for setting a user function of a portable terminal having a plurality of stages. The setting contents may include contents the setting size of which having a predetermined range such as control setting contents of an iris of a camera, illumination setting contents of a portable terminal, and audio setting contents of the portable terminal.

The RF communication 110 forms a communication channel for voice call, a communication channel for video phone call, and a communication channel for transmitting data such as images or messages under the control of the controller 160. That is, the RF communication unit 110 forms a voice call channel, a data communication channel, and a video phone call channel between mobile communication systems. To do this, the RF communication unit 110 may include a transmitter (not shown) up-converting a frequency of a transmitted signal and amplifying the signal, a receiver low-noise-amplifying a received signal and down-converting the signal. In particular, the RF communication unit 110 of the present embodiment may perform a data communication channel with an external certain server or another portable terminal, and receive moving image contents through a corresponding data communication channel. In this case, the moving image contents received by the RF communication unit 110 may be output on the touch screen 140 in a real-time manner. The output moving image contents may be temporarily or semi-permanently stored in the memory 150. Further, the RF communication unit 110 may download moving image contents through the data communication channel, and the downloaded moving image contents may be temporarily or semi-permanently stored in the memory 150. When playing the moving image contents received through the RF communication unit 110, the controller 160 may perform a control operation to output a main slider for searching contents of the present invention on the touch screen 140. The controller 160 may perform a control operation to output an auxiliary slider capable of finely searching a partial section of contents according to creation of an additional touch event.

The input unit 120 includes a plurality of input keys and function keys for receiving input of numeral or character information, and for setting various functions. The function keys may include arrow keys, side keys, and hot keys set to perform certain functions. Further, the input unit 120 generates and transfers key signals associated with user setting and function control of the portable terminal 100 to the controller 160. The input unit 120 may be implemented by a Qwerty key pad, a 3*4 key pad, and a 4*3 key pad having a plurality of keys. Further, the input unit 120 may be implemented by a Qwerty key map, a 3*4 key map, a 4*3 key map, a menu map, and a control key map. Further, when a touch screen 140 of the portable terminal 100 is supported in the form of a full touch screen, the input unit 120 may include only side keys formed at a side housing of the portable terminal 100. In particular, the input unit 120 of the present invention may generate an input signal for outputting a main slider, an input signal for eliminating the main slider, an input signal for outputting an auxiliary slider, and an input signal for eliminating an auxiliary slider under the control of the user according to an embodiment of the present invention. When generating the input signals, the controller 160 may perform a control operation to output the main slider on the touch screen 140 for finely controlling currently executed contents. Upon activation of the contents, when a predetermined time lapses while the main slider is automatically output for a predetermined time or is output according to a request of the user, it may be eliminated from the display 141. Accordingly, the input unit 120 supports generation of an input signal for outputting a corresponding main slider such that the user may request re-output of the main slider eliminated from the display 141 and elimination thereof.

The audio processor 130 includes a speaker for outputting audio data transmitted/received and audio data included in a received message at the calling time, and audio data according to playback of an audio file stored in the memory 150, and a microphone MIC for capturing a voice of the user or other audio signals at the calling time. When a main slider is output on the display 141, the audio processor 130 may output a corresponding sound effect. When the user creates an optional touch event according to an operation of the main slider, the audio processor 130 may output a sound effect corresponding to creation of a corresponding touch event. The sound effect associated with the main slider may be omitted according to user setting. In the meantime, the audio processor 130 supports output of audio setting contents. When the audio setting contents are activated, the audio processor 130 may support control of an audio gain. For example, when the audio signal is captured, the audio processor 130 controls a gain of the captured audio. When the audio signal is output, the audio processor 130 may control a gain of an output audio signal. As the audio setting contents are activated, the touch screen 140 may output an audio setting screen. A main slider may be output to set at least one audio related function on the setting screen. An auxiliary slider may be output on a region adjacent to a main slider or a region at least a part of which overlapping with the main slider according to an additional input signal.

The touch screen 140 includes a display 141 and a touch panel 143. The touch screen 140 may have a structure in which a touch panel 143 is arranged at a front surface of the display 141. The size of the touch screen 140 may be determined by the size of the touch panel 143.

The display 141 displays information input by the user or information to be provided to the user as well as various menus of the portable terminal 100. That is, the display 141 may provide various screens such as an idle screen, a menu screen, a message creation screen, and a call screen according to the use of the portable terminal 100. The display 141 may be configured by a Liquid Crystal Display (LCD) or an Organic Light Emitted Diode (OLED). In particular, a display 141 may output a main slider at a perimeter portion of the screen according to activation of certain contents. The main slider is output to have a main slidable path capable of designating or searching a certain region of entire regions of corresponding contents according to a function supported from the contents. In this case, because the size of the portable terminal 100 is limited, the length of the main slidable path may be fixed. When the portable terminal 100 supports screen conversion according to conversion of a landscape mode and a portrait mode, the main slider may have two main slidable fixed paths according to a ratio of a converted screen. The main slider may be displayed at a perimeter portion of the screen, for example, an upper portion, a lower portion, a left side, or a right side according to a designer's intention or a setting control of the user. In some cases, the main slider may be output to a center of the screen.

In the meantime, when a predetermined input signal requesting output of an auxiliary slider occurs in a display state of the main slider, the auxiliary slider may be output on a region adjacent to the main slider. In particular, the auxiliary slider may be output on a region adjacent to a main search bar of the main slider. A partial region of contents searched by the auxiliary slider may be defined with a preset size. The preset size may be set corresponding to a partial length of contents. Meanwhile, an auxiliary slidable path included in the auxiliary slider can be smaller than the main slidable path, the longer the design of the auxiliary slidable path, the finer the detail of the corresponding contents that can be searched thereby. However, because displaying a relatively large auxiliary slider may result in too much screen blockage, inconveniencing the user, the auxiliary slider can be arranged parallel with the main slider, and its length is kept relatively small to a predetermined length. In this case, the auxiliary slider may be output on a region adjacent to an output region of a main search bar of the main slider or a region at least a part of which overlaps with the main slider. A display form of the main slider and the auxiliary slider may be described with reference to following drawings in detail.

The touch panel 143 can be disposed coincident with the display 141, and generates a touch event according to contact of a touched object, for example, the user's finger, and transfers the generated touch event to the controller 160. In this case, a sensor configured by the touch panel 143 is arranged in the form of a matrix. Corresponding location information with respect to a touch event occurring on the touch panel 143 and information with respect to a type of a touch event are transferred to the controller 160. In particular, the touch panel 143 of the present invention may generate a touch event for output of an auxiliary slider in a location corresponding to a region of a display 141 on which a main slider is output according to a touch operation of the user. The touch event for outputting the auxiliary slider may be set to at least one of various touch events such as a long-touch event occurring on a main search bar, a tap-touch event touching a main search bar many times, and a drag touch event occurring in a direction regardless of a moving direction of a main search bar on the main slider. Hereinafter, a touch event for outputting an auxiliary slider is described based on a long-touch event.

The memory 150 may store a key map or a menu map for an operation of the touch screen 140 as well as an application program necessary for a function operation according to an embodiment of the present invention. In this case, the key map or the menu map may be embodied in various forms. That is, the key map may be a keyboard map, a 3*4 key map, a Qwerty key map, or a control key map for controlling an operation of a currently activated application program. Further, the menu map may be a menu map for controlling an application of a currently activated application program. The memory 150 may primarily include a program area and a data area.

The program area may store an operating system (OS) for booting the portable terminal 100 and operating the foregoing elements, an application program for playing various files, for example, an application program for supporting a call function of the portable terminal 100, a web browser for accessing an Internet server, an MP3 application program for playing other sound sources, an image output application program for playing photographs, and a moving image playback application program. In particular, a program area of the present invention may store an auxiliary slider supporting program 151 for supporting an auxiliary slider.

When an event for activating contents upon which the main slider can be superimposed occurs, the auxiliary slider supporting program 151 is loaded to the controller 160 to support the display of an auxiliary slider for controlling corresponding contents. To do this, the auxiliary slider support program 151 includes a routine for checking activation of contents to which the main slider is associated, a routing for outputting a main slider to a perimeter portion of the display 141 when activating corresponding contents and for setting a touch panel 143 for supporting a main slider, and a routine for detecting a touch event on the main slider from a touch panel 143. The auxiliary slider support program 151 may include a routine for outputting an auxiliary slider to a region adjacent to a region in which a main search bar of the main slider is located or a region at least a part of which overlaps with the main slider according to a type of the touch screen and accordingly setting the touch panel 143. The data area is an area in which data created according to use of the portable terminal 100 are stored, and may store phone-book data, at least one icon or various contents according to a widget function. Further, the data area may store a user operation input through the touch panel 143. In particular, the data area may store characteristic information of the auxiliary slider in association with contents. A main slidable path and a contents search response ratio in the main slider may be changed according to the size or a form of contents. That is, in the main slider to be output having the same slidable path, a change region of contents to be moved when moving a predetermined part of the main search bar may be changed according to the size and a display form of the contents. Accordingly, the data region may store contents search response ratio information of a main slider by contents, and upgrade the contents search response ratio information according to size change in the contents. The size of list contents such as phone-book may be increased due to addition of items or reduced due to elimination thereof. Accordingly, the data area stores contents search response ratio information of the main slider and changed information under the control of the controller 160. The data region may further store contents search response ratio information of an auxiliary slider. Substantially, the contents search response ratio of the auxiliary slider may be a partial region of contents search response ratio of the main slider.

The controller 160 controls power supply to respective elements of the portable terminal 100 to perform an initializing procedure. The controller 160 determines whether an operation of the portable terminal 100 is an operation requesting activation of contents requiring a main slider. When a corresponding operation is generated, the controller 160 may control the main slider to be output on display 141. Next, the controller 160 checks generation of a signal for outputting an auxiliary slider and supports output of a corresponding auxiliary slider. For example, the controller 160 collects a touch event occurring on a touch panel 143 of a region in which the main slider is arranged, and supports output of an auxiliary slider for finely searching a predetermined region of contents. To do this, the controller 160 may have a construction as illustrated in FIG. 2.

Figure 2:
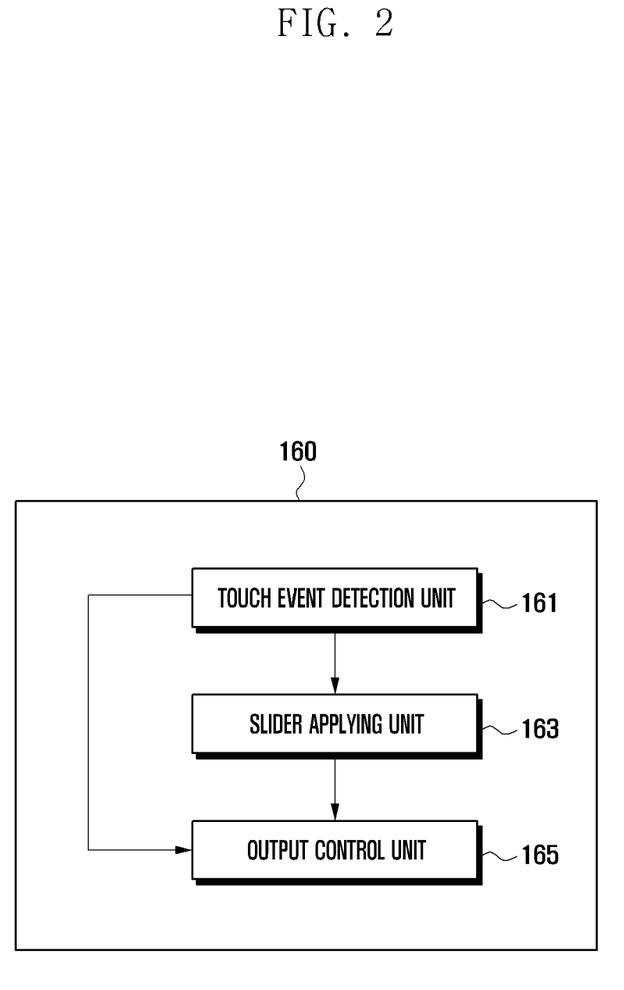
FIG. 2 is a block diagram illustrating an example configuration of a controller shown in FIG. 1.

FIG. 2 is a detailed block diagram illustrating an example configuration of a controller 160 shown in FIG. 1. Controller 160 may include a touch event detection unit 161, a slider applying unit 163, and an output control unit 165. The touch event detection unit 161 detects a touch event occurring from the touch panel 143. In particular, the touch event detection unit 161 detects a touch event at an output point of the main slider, and transfers the detected touch event to a slider applying unit 163 or the output control unit 165. Further, the touch event detection unit 161 may select an icon or a menu item requesting search of a predetermined region of contents or detect a touch event corresponding to a gesture on the touch panel 143. The touch event detection unit 161 may detect a touch event for displaying an auxiliary slider, and transfer the detected touch events to a slider applying unit 163 and/or an output control unit 165.

The slider applying unit 163 checks contents activated due to a touch event transferred from the touch event detection unit 161. In this case, the slider applying unit 163 checks whether corresponding contents are contents requesting output of the main slider, and the slider applying unit 163 may output a main slider according to characteristics of the contents. The slider applying unit 163 may perform a control operation to output an auxiliary slider according to a touch event transferred from the touch event detection unit 161. For example, when a long-touch event occurring on the main slider is transferred to the slider applying unit 163, it outputs the auxiliary slider to the region adjacent to the main slider or a region at least a part of which overlaps with the main slider. The auxiliary slider finely searches, designates, or sets a partial or certain region of contents.

When the slider applying unit 163 determines outputs of the main slider and the auxiliary slider, the output control unit 165 may control output of a corresponding main slider and auxiliary slider on the display 141. Further, the output control unit 165 may control activation of contents according to a touch event detected by the touch event detection unit 161. For example, the touch event occurs on the main slider, the output control unit 165 controls screen change according to activation of a corresponding touch event and contents. If the touch event occurs on the auxiliary slider, the output control unit 165 may perform a control operation to specifically search or designate a partial region of contents corresponding to the auxiliary slider according to the touch event occurring on the auxiliary slider.

In this case, although a touch event occurring on the main slider or a touch event occurring on the auxiliary slider is a drag touch event having the substantially same length, the output control unit 165 may control change in reproduced contents differently according to a contents search response ratio set in each slider. That is, the output control unit 165 may control a degree of screen change according to generation of the constant length drag touch event on the main slider at a higher degree than that according to creation of the constant length drag touch event on the auxiliary slider. (This control of degree of screen change can thereby provide "coarse" searching of contents with the main slider and "fine" searching of contents with the auxiliary slider.) The function may cause the auxiliary slider to specifically search or designate with respect to a partial region of contents corresponding to the main slider. In this case, the auxiliary slidable path of the auxiliary slider may extend and display a partial part of the main slider or a partial region of a main slidable path of the main slider.

In order for a user to finely control the extending and displaying procedure, the output control unit 165 may extend and output the auxiliary slidable path in an auxiliary slider restricted according to a previous setting in various forms.

A detailed description of an exemplary operation finely controlling contents search/designation will now be described.

As described above, when contents controllable by the main slider are activated, portable terminal 100 selectively operates an auxiliary slider supported to finely search a partial region of contents according to a touch operation of the user. Accordingly, this embodiment may minimize screen recognition failure according to output of a slider, and finely search or designate particular portions of contents desired by the user, among the entire contents of a program, etc., at the desired time point of the user specifically, easily, and rapidly.

Figure 3:
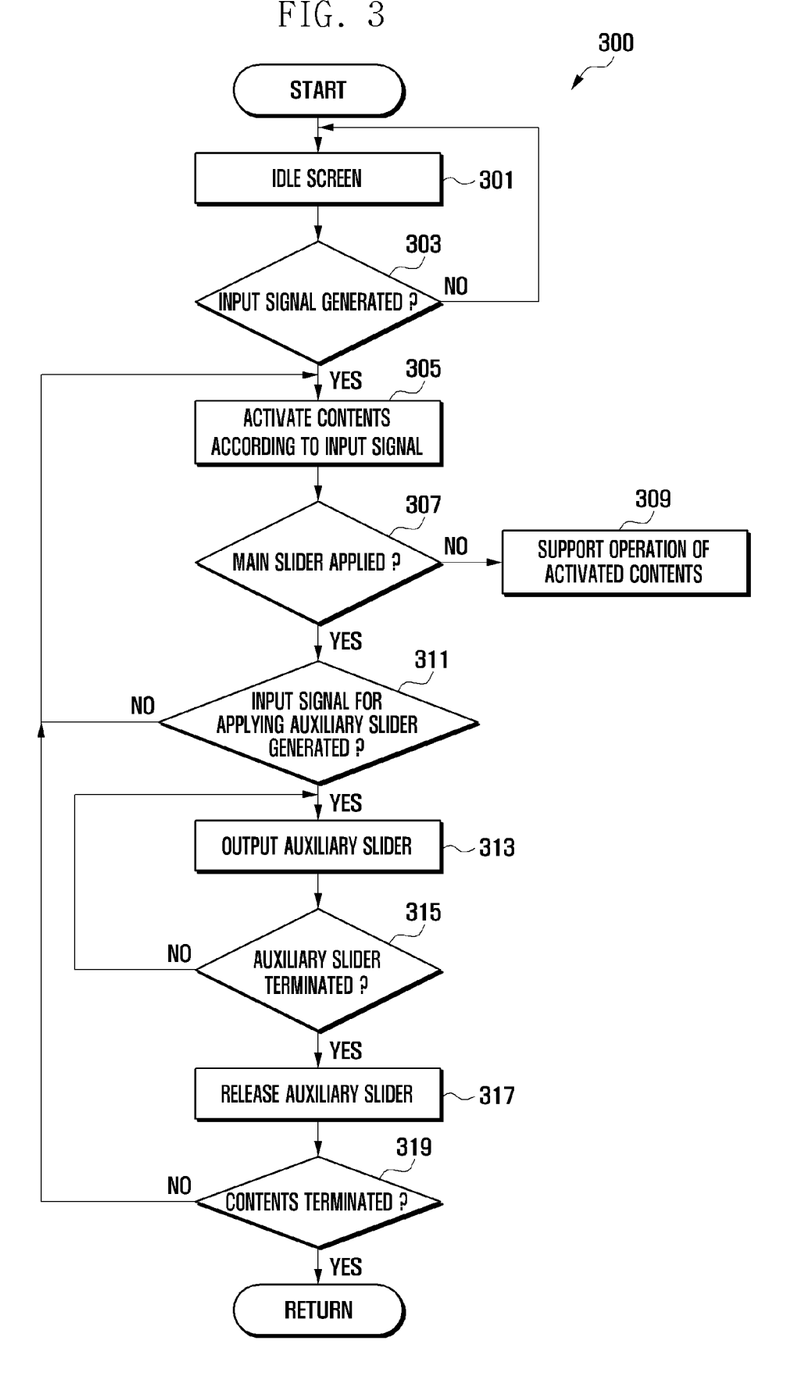
FIG. 3 is a flowchart illustrating a method for finely controlling searching and designating of contents according to an exemplary embodiment.

FIG. 3 is a flowchart illustrating an example method, 300, for finely controlling searching and/or progress designation of contents according to an embodiment In the method, at (301), when power is supplied to the portable terminal 100, the controller 160 provides the supplied power to respective elements of the portable terminal 100 to perform an initializing procedure, and may perform a control operation to output an idle screen according to schedule information. Next, the controller 160 may determine whether a particular input signal for displaying contents is generated (303). When the input signal is not generated at step 301, the controller 160 may return to step 301, and perform a control operation to maintain output of an idle screen, and enter in a sleep mode according to preset schedule information.

Conversely, when the input signal is generated at step 303, the controller 160 may perform a control operation to activate contents according to the generated input signal (305). The controller 160 may next determine whether a main slider is applied to corresponding contents (307). To do this, the controller 160 may check characteristics of contents stored in the memory 150. When the contents have no main slider applying characteristic, the controller 160 supports an operation of activated contents (309). Conversely, when the main slider needed to be applied to contents is activated, the controller 160 performs a control operation to output the main slider at a perimeter portion of the display 141 according to a pre-established design as default or user request while activating contents. In this case, the controller 160 may perform a control operation to output the main slider in at least one of upper, lower, left, and right sides of the display 141 to have a predetermined width and length.

Next, the controller 160 may determine whether an input signal for applying the auxiliary slider is generated (311). That is, the controller 160 may determine whether an input signal for outputting the auxiliary slider, for example, a certain input signal set for detecting a preset touch event for an auxiliary slider, occurring on the main slider, is generated. When the input signal for outputting the auxiliary slider is not generated at step 311, the controller 160 may perform a control operation to activate contents, and support to maintain or eliminate output of the main slider. The main slider may be temporarily eliminated on the display 141 according to presence of support of a contents function or lapse of a predetermined time or a request. Conversely, if a signal for outputting the auxiliary slider is generated at step 311, the controller 160 may perform a control operation to display the auxiliary slider at a perimeter portion of the display 141 (313). In particular, the controller 160 may perform a control operation to display the auxiliary slider at a region adjacent to the main slider or a region at least a part of which overlaps with the main slider. Further, the controller 160 may perform a control operation to output an auxiliary slider at a region adjacent to a corresponding main search bar or a region at least a part of which overlaps with the main search bar based on the main search bar displayed on the main slider.

Next, the controller 160 may determine whether an event for terminating the auxiliary slider is generated (315). The event for terminating the auxiliary slider may include a state where there are no separate input signals for a predetermined time in a display state of an auxiliary slider, or generation of a certain input signal established to eliminate an auxiliary slider. When the corresponding event is not generated, the controller 160 may maintain output of the auxiliary slider, and finely search or designate contents part based on the auxiliary slider.

When the event for terminating the auxiliary slider occurs at step 315, the controller 160 performs a control operation to release the auxiliary slider (317). Accordingly, the contents activation screen and a main slider screen may be output on the display 141. The controller 160 may perform a control operation to temporarily eliminate the main slider from the display 141 according to preset schedule information. Subsequently, the controller 160 determines whether an input signal for terminating the contents is generated (319). When there is no separate input signal for terminating the contents, the controller 160 returns to step 205 and supports operation of contents. When the input signal for terminating the contents is generated at step 319, the controller 160 controls termination of the activated contents, and returns to step 301 and repeats the foregoing procedures.

As discussed above, a method for finely controlling contents according to an embodiment may display an auxiliary slider to finely designate or search a part of contents coarsely controlled via the main slider, according to generation of an input signal. To do this, the auxiliary slider may be configured to have an auxiliary slidable path extending a predetermined part of a main slider, for example, a predetermined region of a main slidable path in which a main search bar is located.

Hereinafter, methods for finely controlling contents will be described in the context of example screens displayed by portable terminal 100.

Figure 4:
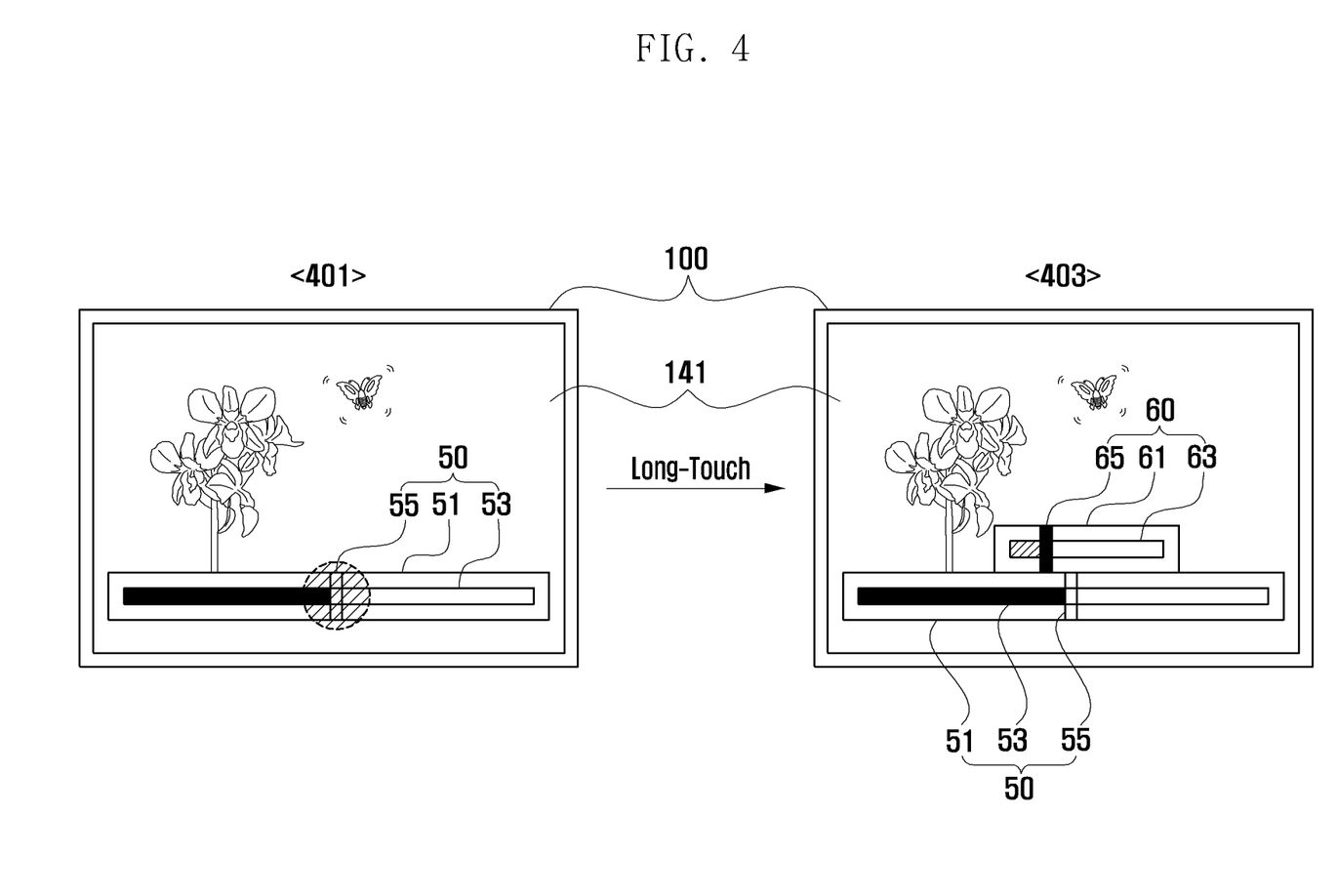
FIG. 4 is a view illustrating an example of a screen for describing a method for controlling contents according to an exemplary embodiment.

FIG. 4 is a view illustrating an example of a screen for describing a method for specifically controlling contents according to an embodiment. Portable terminal 100 may activate certain contents according to generation of an input signal for activating contents and output a screen for supporting the activated contents on the display 141 as illustrated in screen 401. Hereinafter, the contents will be described as moving image (i.e., video) contents by way of example. Other examples, such as photos in a photo book, music, etc., as mentioned above, are also possible. That is, the contents are configured by a plurality of elements as illustrated above, which become contents capable of indicating or searching a predetermined region based on a slider.

Hereinafter, a slider of a form having a search bar will be described. However, as mentioned above, other forms are possible. That is, the main slider 50 and the auxiliary slider 60 of the present disclosure may be displayed as a slider with only a slidable path without the search bar. When there is no search bar, the main slider and the auxiliary slider may provide a relative location of currently played contents on the slidable path in various distinct marks such as a predetermined mark or color conversion. A display form of the slidable path may be identical with that of a slider body to be described below. In this case, the slidable path may become the slider body itself. When the slidable bar is included, it acts as a marker for a contents region, e.g., a relative location of a currently displayed frame(s) in relation to the entire video program including the currently displayed frame(s). In another variant, a pop up "%" indicator may be displayed adjacent the slider, indicating the percentage of progress of the reproduced contents, which can augment the slider representation of the progress.

Referring to screen 401, the display 141 may output a main slider 50 at a perimeter portion of a screen (typically top or bottom portion) according to activation of certain contents. The main slider 50 may include a main slider body 51 having a predetermined width and length, a main search bar 55 arranged in the main slider 50, and a main slidable path 53 in which the main search bar 55 may move. In other implementations, as mentioned above, the main slider body 51 can be eliminated, such that the user recognizes the slider path position simply as a difference in brightness or color between the left and right portions of the slidable path 53. In addition, exemplary search bar 55 is shown as a rectangle; it can alternatively be other shapes such as a circle or triangle, or can be eliminated altogether. (In the latter case, the demarcation line between left and right portions of the slidable path can be dragged by the user to achieve a slider bar function.) The full length of the main slidable path 53 may be changed according to the size and a display pattern of contents. Further, a rate at which contents are scrolled (content scrolling rate) according to a moving distance of the main search bar 55 on the main slidable path 53 may be changed according to the size of the contents, e.g., the total number of frames configuring the contents. Accordingly, a contents scrolling rate due to a moving distance of the main search bar 55 in contents having relatively many frames may be greater than that for contents having few frames. As a result, because the main search bar 55 moves by a short distance to rapidly change contents, the user needs fine control to perform precision search for a particular frame.

To solve the foregoing inconvenience, when a predefined touch event occurs on the main slider 50 or the main search bar 55, the controller 160 may output an auxiliary slider 60 for display at a predetermined location as illustrated in screen 403. As will be described more fully below, auxiliary slider 60 is used to scroll contents at a slower rate per sliding distance than main slider 50. Thus, sliding auxiliary slider performs fine control of scrolling/searching contents whilst sliding main slider 50 performs coarse control.

The predefined touch event resulting in the display of auxiliary slider 60 can be a "long touch", i.e., detection of a continuous touch contact longer than a predetermined time, at a point on main slider 50. The touch contact is illustrated by the shaded circle superimposed over slider 50. Other types of touch events are also possible for this purpose.

The auxiliary slider 60 may include an auxiliary body 61, an auxiliary search bar 65 arranged in the auxiliary slider 60, and an auxiliary slidable path 63 in which the auxiliary search bar 65 may move. (Analogously to the variant mentioned above for main slider 50, the auxiliary body 61 can be eliminated, and search bar 65 can be other shapes or alternatively eliminated.) The auxiliary slidable path 63 may be configured by a length extending a predetermined region or fractional length of the main slidable path 53 of the main slider 50. Accordingly, while the auxiliary search bar 65 is moving in the auxiliary slidable path 63, contents output on the display 141 changes, i.e., the contents are scrolled. In a case where the contents are video contents, when the auxiliary search bar 65 moves in a forward direction, frames disposed in the front of a current frame are output on the display 141. When the auxiliary search bar 65 moves in a rear direction, frames preceding a current frame may be output on the display 141.

In the example embodiment of FIG. 4, the auxiliary slidable path 63 is configured by extending a partial region of the main slidable path 53. In other words, the display area of slidable path 63 is an extension of the display area of slidable path 53, as shown. When the auxiliary search bar 65 moves in a corresponding path, currently activated contents have relatively small frame change than for the same moving length on the main slider. In this case, the auxiliary slider body 61 may be configured shorter than the length of the main slider body 51.

Once auxiliary slider 60 is displayed, the user can control the auxiliary search bar 65 as a continuous operation that continues from the prior long touch on main slider 50. To do this, the auxiliary slider 60 may be output a location adjacent to an output location of the main search bar 55 or a location at least a part region of which overlaps with the main search bar 55. If the user thereafter releases touch on auxiliary slider 60 to terminate fine control, the controller 160 may perform a control operation to remove the auxiliary slider 60 from the display 141. In some implementations, removal may occur immediately following touch release; in others, removal may occur after a predetermined time following touch release. The removing manner of the auxiliary slider 60 thus depends on a preset design scheme For instance, when a separate input signal is not generated for a corresponding time, the controller 160 may remove the auxiliary slider 60.

Figure 5A:
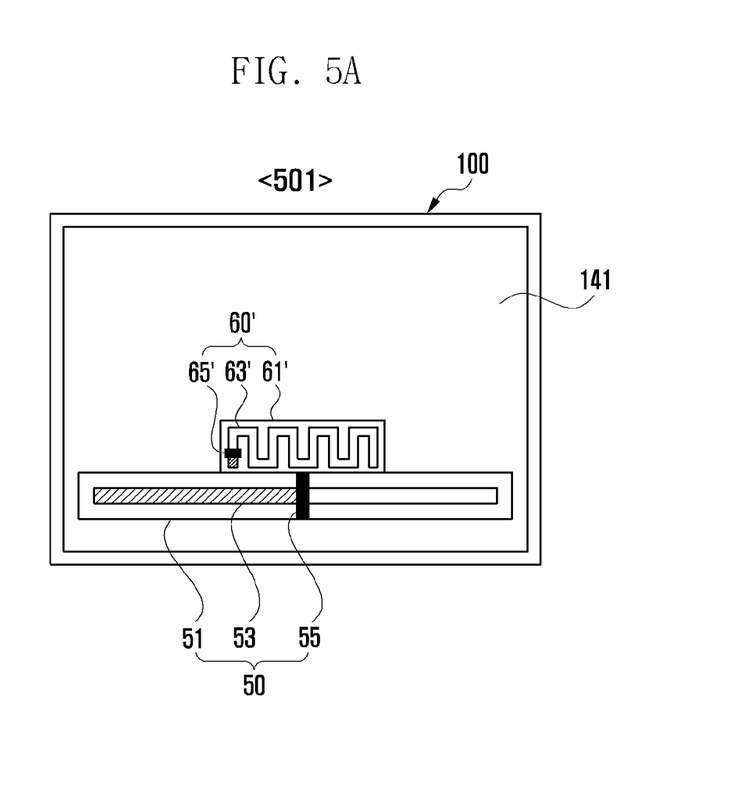
FIG. 5A and FIG. 5B are example screens for describing respective alternative embodiments of auxiliary sliders and methods for fine control of contents searching and designation.

FIG. 5A is a view illustrating an example screen for describing an alternative embodiment of an auxiliary slider and a method for finely controlling contents. In the following description of this embodiment, video will be used as an example of the contents to be controlled. (Note that for simplicity of illustration, images are absent from the screen of FIG. 5A, but it is understood that the sliders shown can be superimposed with images on display 141.)

In FIG. 5A, an auxiliary slider 60' of the present embodiment may maximize an auxiliary slidable path 63' in a limited auxiliary slider body 61' as illustrated in screen 501. That is, because the auxiliary slidable path 63' is configured by a path having at least one inflection point (e.g., a zigzag shape as illustrated) in an auxiliary slider body 61' arranged in predetermined width and length, the auxiliary slider 60' may extend a real physical movable path. Accordingly, the auxiliary slider 60' of the present embodiment includes an auxiliary search bar 65' for indicating fine control of the contents or a mark for indicating a designated location of current contents. (Analogously to the variants mentioned above, auxiliary body 61' can be eliminated, and search bar 65' can be formed by different shapes or alternatively eliminated.)

Comparing the embodiment of FIG. 5A with that of FIG. 4: in FIG. 4, for example, when a total length of auxiliary slidable path 63 on a screen is 1 cm and the auxiliary slidable path 63 is configured corresponding to 100 frames, when the auxiliary search bar 65 moves by 1 mm, 10 frames may be sequentially output on the display 141. In FIG. 5A, as illustrated in screen 501, when the auxiliary slidable path 63' is provided in the same space in an extended form, the total length of the auxiliary slidable path 63 may be extended. For example, a total length of the auxiliary slidable path 63' on screen 501 may be increased by 10 cm. Accordingly, the auxiliary search bar 65 moves by 1 cm, ten frames may be sequentially output on the display 141. As a result, the user may more easily perform finer search of frames using an auxiliary slidable path 63' that reacts even less sensitively in a frame search procedure.

Figure 5B:
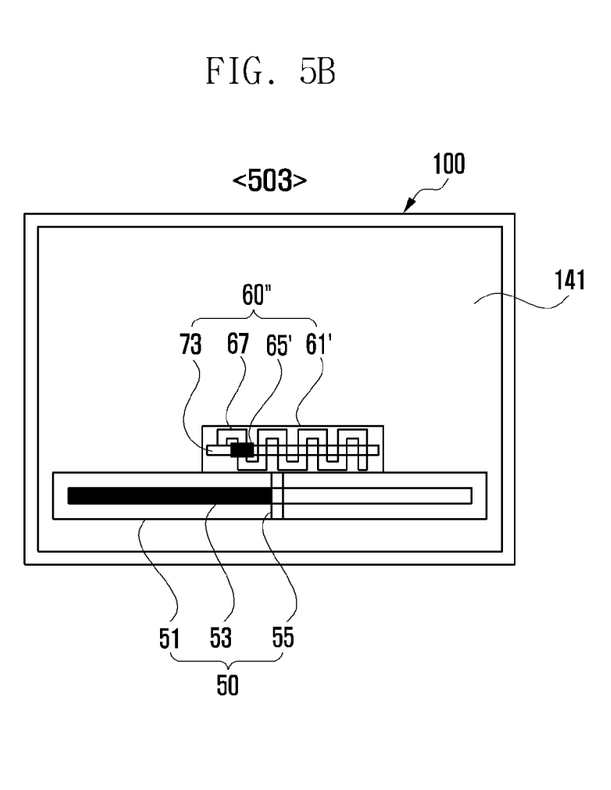

FIG. 5B illustrates another alternative embodiment of an auxiliary slider and a method for finely searching for and controlling contents. Auxiliary slider 60" includes a first auxiliary slidable path 73 and a second auxiliary slidable path 67 as illustrated in screen 503. In this case, the first auxiliary slidable path 73 may have the same characteristics as those of the auxiliary slidable path 63 illustrated in screen 403 of FIG. 4. The auxiliary slidable path 67 may have characteristics as illustrated in screen 501. Accordingly, the user may perform fine search for certain frames through the first auxiliary slidable path 73, and perform an even finer frame search through the second auxiliary slidable path 67. In this case, frames arranged at an intersection of the second auxiliary slidable path 67 and the first auxiliary slidable path 73 are identical with each. That is, a designation value or search value of contents may be equally set in the intersection. Accordingly, the user may perform detailed frame search using the second auxiliary slidable path 67 at a certain intersection while moving the auxiliary search bar 65' based on the first auxiliary slidable path 73. The number of frames corresponding to a certain section of the first auxiliary slidable path 73 at the intersection is identical with that of frames corresponding to a certain section of the second auxiliary slidable path 67 at the intersection. As a result, because the second auxiliary slidable path 67 has a form relatively extending the first auxiliary slidable path 73, the user may easily search or designate frames using a second auxiliary slidable path 67 less sensitive to variation in contents according to a moving distance if necessary.

In yet another embodiment, an overlapping technology of the first auxiliary slidable path 63 and the second auxiliary slidable path is substantially applicable to the main slider. That is, when the user performs an operation of outputting an auxiliary slider on the main slider 50, the controller 160 may output an auxiliary slider having an inflection point such as the second auxiliary slidable path 67 intersecting the main slider 50 by a predetermined distance associated with the main slider 50. (Thus, in FIG. 5B, this embodiment can be alternatively envisioned by considering that slider 50 is eliminated and replace by slider 73 as a main slider, and with slider 73 extended to be as long as slider 50. Slidable path 67 remains an auxiliary slidable path that is superimposed on slider 73, as shown in FIG. 5B; slider path 67 is displayed only upon a predetermined touch event upon slider 73.)

As described above, portable terminal 100 according to an embodiment of the present disclosure supports output of a selective auxiliary slider 60, 60' or 60" based on the main slider 50 to finely control a certain region of contents in an activating procedure of contents to minimize a failure in finding a desired scene during search, and easily and conveniently designated a desired certain part. A fine control technology of content of the present invention is applicable to search of both of video and music files, as well as scrollable content such as a contact list, photo albums or long web pages. The specific control technology of content of the present invention is applicable to a user function requiring detailed setting, for example, camera option control setting or map searching rate control.

The portable terminal 100 may further include various additional modules according to its applicable form. That is, when the portable terminal 100 is embodied as a communication terminal, it may include structural elements such as a near distance communication module for near distance communication (e.g., Bluetooth, WiFi capability), a camera module for taking still images/moving images, an interface for data transmission/reception in a wired communication scheme or a wireless communication scheme of the portable terminal 100, an Internet communication module for communicating with an Internet to perform an Internet function, and a digital broadcasting module for performing digital broadcasting reception and playback functions. Since the structural elements can be variously changed according to convergence trend of a digital device, these elements are not described herein. However, the portable terminal 100 may include structural elements equivalent to the foregoing structural elements. Further, certain elements may be omitted from the foregoing elements or may be substituted by other elements in the described portable terminal 100, without departing from the scope of the present invention. This will be easily understood to those of skill in the art.

The portable terminal 100 of the present invention may include devices of various types having a Wi-Fi module. For example, the portable terminal 100 may include all information and communication devices and multi-media devices, and application devices thereof. For example, the portable terminal may include various information communication devices and multi-media devices such as Portable Multimedia Player (PMP), Personal Digital Assistant (PDA), music player (e.g., MP3 player), and a portable game terminal, smart phone, notebook computer, and handheld PC, and application devices thereof as well as mobile communication terminal operating based on respective communication protocols corresponding to various communication systems.

The above-described methods according to the present invention can be implemented in hardware, firmware or as software or via the execution of computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A portable terminal comprising:
 a display configured to display a main slider including a slidable path of a predetermined length for coarsely scrolling contents reproduced in the portable terminal, the main slider occupying a first elongated region, and an auxiliary slider extending at least a part of a slidable path of the main slider, the auxiliary slider for finely scrolling the contents;

at least one of a touch panel and an input unit configured to generate a signal for selectively displaying the auxiliary slider; and a controller configured to present the auxiliary slider via the display according to generation of the signal, wherein the auxiliary slider has a nonlinear path with a plurality of peaks and valleys and occupying a second elongated region lengthwise parallel to the first elongated region.

2. The portable terminal of claim 1, wherein the portable terminal includes said touch panel, the main slider performing a coarse contents control function such that a particular change in position of a marker on the main slider, via a touch drag on the main slider, produces a larger change in a scrolling of the contents reproduced than the same change in position of a marker on the auxiliary slider.

3. The portable terminal of claim 1, wherein the display displays the auxiliary slider to an upper region adjacent to the main slider.

4. The portable terminal of claim 1, wherein a length of the auxiliary slider is shorter than a length of the main slider.

5. The portable terminal of claim 1, wherein the second elongated region overlaps the first elongated region.

6. A method operative in a portable terminal having a display, the method comprising:

displaying on the display a main slider including a slidable path of a predetermined length for coarsely scrolling contents reproduced in the terminal, the main slider occupying a first elongated region;

determining whether a predefined input signal is generated; and displaying an auxiliary slider of a length extending at least a part of a slidable path of the main slider when the input signal is generated, the auxiliary slider finely scrolling the contents, wherein the auxiliary slider has a nonlinear path with a plurality of peaks and valleys and occupying a second elongated region lengthwise parallel to the first elongated region.

7. The method of claim 6, further comprising removing the auxiliary slider from the display when either an input signal for removing the auxiliary slider is generated, or a particular input signal for maintaining the display of the auxiliary slider is not generated for a predetermined time period.

8. The method of claim 6, wherein the auxiliary slider is displayed at an upper region adjacent to the main slider.

9. The method of claim 6, the main slider includes a main slider body having a predetermined width and length, a main search bar arranged in the main slider, and main slidable path in which the main search bar moves.

10. The method of claim 6, wherein a length of the slidable path of the main slider is changed according to a size and a display pattern of contents.

11. A non-transitory computer-readable storage medium storing instructions that, when executed, cause at least one processor to perform the method according to claim 6.

12. A portable terminal comprising:

a display for displaying a main slider including a slidable path of a certain length for coarsely scrolling contents reproduced in the portable terminal and an auxiliary slider extending at least a part of a slidable path of the main slider, the auxiliary slider for finely scrolling the contents;

at least one of a touch panel and an input unit for generating a signal for selectively displaying the auxiliary slider; and a controller for presenting the auxiliary slider on the display according to generation of the signal;

wherein, the main slider is linear, and the auxiliary slider has an oblong profile, with a first, nonlinear auxiliary slidable path having at least one peak and at least one valley, and a second auxiliary slidable path that intersects the first auxiliary slidable path, in which the first and second intersecting auxiliary slidable paths are configured for different degrees of fine search control.

13. The portable terminal of claim 12, wherein the first, nonlinear slidable path has a plurality of peaks and valleys.

14. The portable terminal of claim 13, wherein the second auxiliary slidable path is a linear path.

\* \* \* \* \*